UNITED STATES PATENT OFFICE 2,517,132

PRIMARY CELL

Glenn T. Piper, North Canton, and Otis B. Sutton, Canton, Ohio, assignors to the United States of America as represented by the Secretary of the Navy No Drawing. Application March 26, 1946, Serial No. 657,354

1 Claim. (Cl. 136—106)

This invention relates to primary batteries and has particular relation to electrode elements for use in the voltaic cells constituting said batteries.

One type of primary battery cell to which the present invention relates is that employing a positive electrode composed of lead and a co-operating negative electrode, the positive lead electrode being coated with lead peroxide ($PbO_2$), also known in the art as lead dioxide or platternite. One objection to voltaic cells of this type is that when pure lead is employed as the positive electrode, and lead peroxide is employed as a depolarizer therefor, the lead peroxide reacts with the pure lead in such a manner as to render the lead peroxide inactive as a depolarizer. This reaction has the effect of greatly reducing the voltage output of the primary cell.

An object of the present invention is to provide a lead alloy cathode for the primary cell, which cathode will not combine or react with a lead peroxide depolarizer.

Another object of the present invention is to provide a lead alloy cathode for a primary cell, which cathode will eliminate or reduce a voltage drop in the cell due to the reaction of a lead peroxide depolarizer with the lead alloy.

A further object of the invention is to provide a corrosion inhibiting lead alloy for use as a cathode in a primary cell employing lead peroxide as a depolarizer.

Still another object of the invention is to provide a stabilizing component for use in combination with a lead cathode of a primary cell utilizing lead peroxide as the depolarizing element.

These and other objects of the invention will be understood by reference to the following description.

In accordance with the present invention, there is provided for the lead cathode of a primary voltaic cell, a lead alloyed with corrosion inhibiting elements such as tin, bismuth and antimony. This alloy, for most of the range of compositions herein stated, is completely inert with respect to lead peroxide and in all said range reacts far less rapidly with lead peroxide than would pure lead.

In a preferred embodiment of the invention, there is employed a lead alloy which is composed as follows:

| | Per cent by weight |
|---|---|
| Tin | 0.8 to 1.0 |
| Bismuth | 0.6 to 0.8 |
| Antimony | 1.0 to 1.2 |

Although a lead alloyed with approximately from 0.1 to 5.0 per cent by weight of tin is preferred, this particular alloy is not readily available in commercial form; whereas a lead-tin alloy contaminated by bismuth and antimony is readily available and is also satisfactory for the intended purpose. It will be understood that minor amounts of contaminating elements usually found in impure lead are not objectionable inasmuch as these contaminants such as bismuth, antimony, silver, gold and the like function as corrosion inhibiting components in a manner similar to, but in less degree than does tin.

While the particular electrolyte to be used is a matter of wide choice, preferably an acid, or mixture of acids, properly diluted with water, is employed. A simple one is sulfuric acid of about 20% strength, but the preferred composition, when zinc is used as the anode, is made of 1 part hydrochloric acid (38% HCl gas) 8 parts of phosphoric acid (85%) and 8 parts of distilled water, with 2 grams of mercuric chloride per 100 ml. of electrolyte.

What is claimed is:

In a primary voltaic cell, a cathode composed of a lead alloy containing, by weight, from 0.8 to 1.0 per cent tin, 0.6 to 0.8 per cent bismuth and 1.0 to 1.2 per cent antimony, the remainder essentially lead, said cathode having a firmly adherent coating of lead peroxide thereon, to act as a depolarizer, said cell having a zinc anode, and a dilute acid electrolyte.

GLENN T. PIPER.
OTIS B. SUTTON.

REFERENCES CITED

The following references are of record in the file of this patent:

UNITED STATES PATENTS

| Number | Name | Date |
|---|---|---|
| 408,367 | Aldrich | Aug. 6, 1889 |
| 480,266 | Knowles | Aug. 9, 1892 |
| 1,454,943 | Pepper | May 15, 1923 |
| 2,060,534 | Singleton | Nov. 10, 1936 |

FOREIGN PATENTS

| Number | Country | Date |
|---|---|---|
| 505,438 | Great Britain | May 8, 1939 |

OTHER REFERENCES

Vinal, G. W. Storage Batteries, 3rd Ed. (1940) pages 13, 17, 19 and 162.